(No Model.) 2 Sheets—Sheet 2.
F. COSTA.
SAWING MACHINE.
No. 540,951. Patented June 11, 1895.
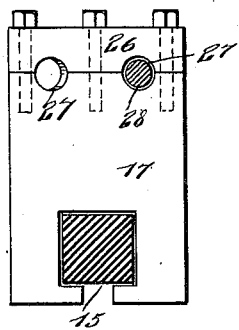
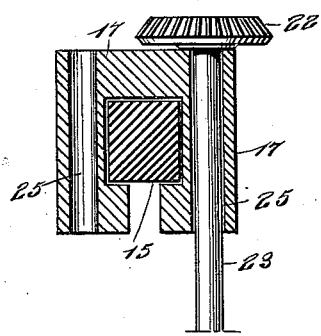
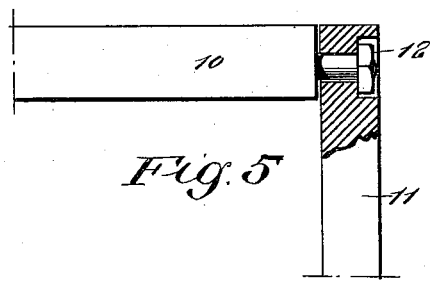
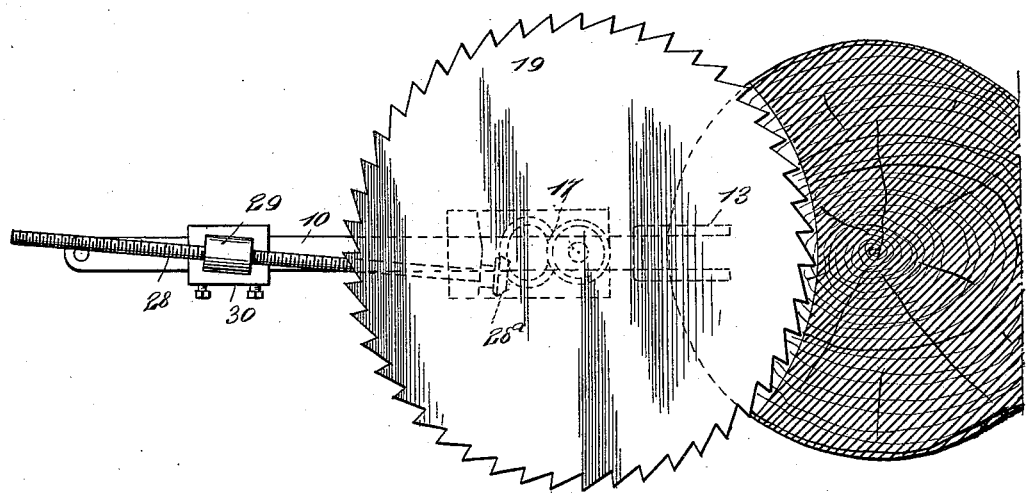
WITNESSES:
John A. Bergstrom
H. P. Hutchinson
INVENTOR
F. Costa
BY Munn & Co.
ATTORNEYS.

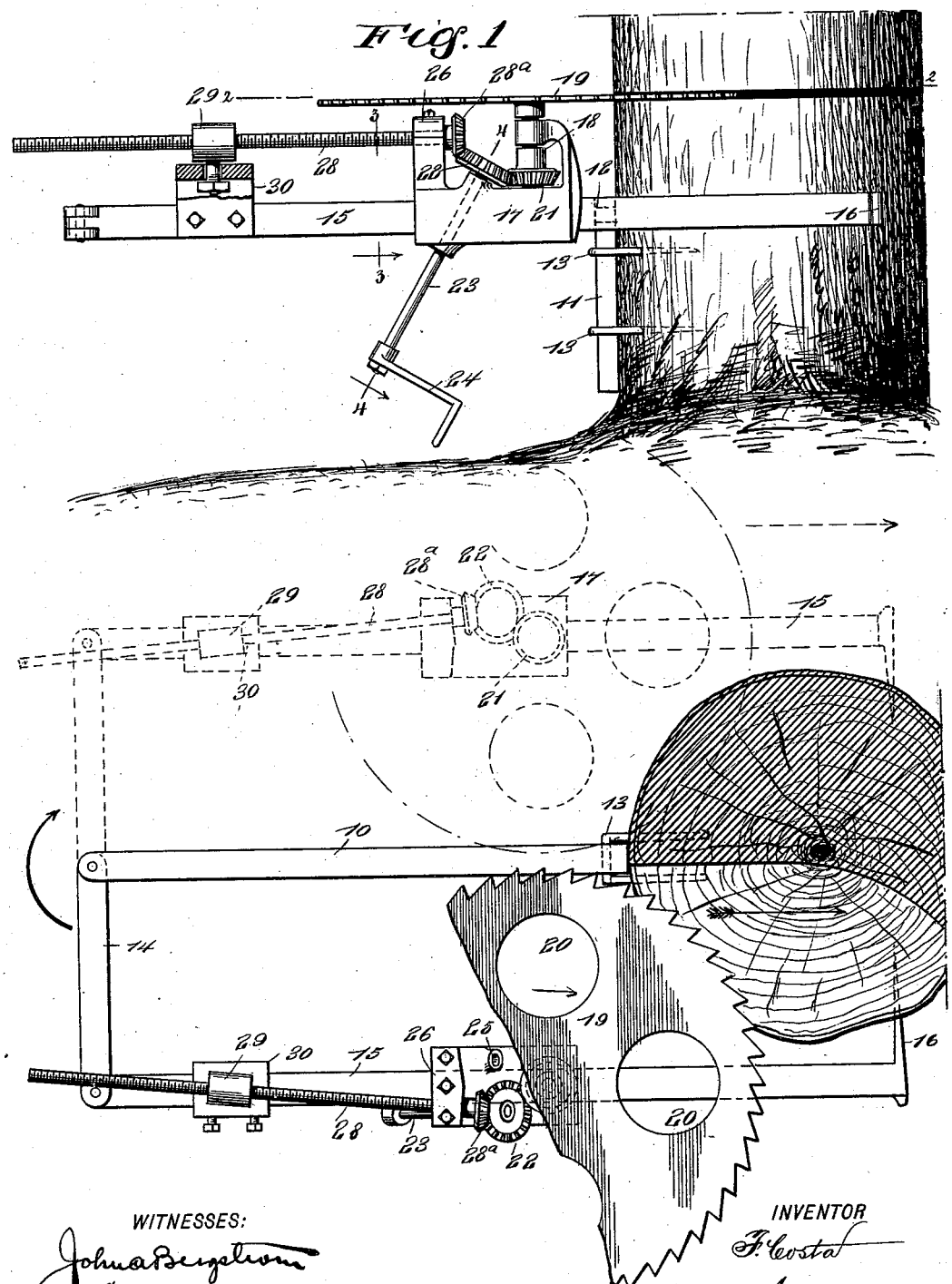

UNITED STATES PATENT OFFICE.

FRANK COSTA, OF CARBONADO, WASHINGTON.

SAWING-MACHINE.

SPECIFICATION forming part of Letters Patent No. 540,951, dated June 11, 1895.

Application filed September 27, 1894. Serial No. 524,256. (No model.)

*To all whom it may concern:*

Be it known that I, FRANK COSTA, of Carbonado, in the county of Pierce and State of Washington, have invented a new and Improved Sawing-Machine, of which the following is a full, clear, and exact description.

My invention relates to improvements in that class of sawing machines which are used for sawing off standing trees; and the object of my invention is to produce a light, strong and simple machine, which may be easily applied to a tree and which, when applied, may be easily worked so as to rapidly saw off the tree, the machine being arranged so that when used on a large tree it may be conveniently made to saw a kerf first on one side and then on the other.

To these ends my invention consists of certain features of construction and combinations of parts which will be hereinafter described and claimed.

Reference is to be had to the accompanying drawings, forming a part of this specification, in which similar figures of reference indicate corresponding parts in all the views.

Figure 1 is a side elevation, partly in section, of my improved machine as applied to a tree. Fig. 2 is a sectional plan on the line 2 2 of Fig. 1. Fig. 3 is a cross-section on the line 3 3 of Fig. 1. Fig. 4 is a cross-section on the line 4 4 of Fig. 1. Fig. 5 is a detail view, partly in section, showing how the main bar is attached to a clamping-plate; and Fig. 6 is a sectional plan of a slightly-modified arrangement of the machine.

The machine is provided with a main bar 10 which, at one end, has a clamping plate 11, this being pivoted to the main bar, as shown at 12, and the clamping plate may be fastened to the tree trunk by staples 13, or equivalent fastening devices.

Pivoted to the outer end of the main bar 10 is a cross bar 14, which is also pivoted to a side bar 15, this being longer than the main bar and being adapted to lie parallel therewith, as shown clearly in Fig. 2. The side bar has, at its free end, a spike 16 or equivalent fastening, by which it may be secured to the tree trunk.

The side bar 15 carries a sliding carriage 17 on which is vertically mounted a saw mandrel 18 which has a large circular saw 19 secured to its upper end, and the saw is preferably provided with holes 20, see Fig. 2, to enable it to be conveniently grasped and lifted from the mandrel.

The saw mandrel 18 has at its lower end a beveled gear 21 meshing with a gear wheel 22 on the upper end of a crank shaft 23, which is journaled in the carriage 17 and extends downward through the same, having at its lower end a crank handle 24 by which it may be revolved. The carriage is provided with two holes 25, one on each side, to receive the shaft 23, so that the crank shaft may be shifted to adapt the machine for use on different sides of the tree, as hereinafter described.

The carriage 17 is provided at its rear end and upper side with a box 26 which has two bearing holes 27 near opposite ends to provide for holding the feed screw 28 in position to gear with the gear wheel 22 when the latter is on either side of the carriage. The feed screw 28 is journaled in the box 26 and threaded into a nut 29 which is pivotally supported on a bracket 30 fastened to the side bar 15 near the outer end thereof, and the screw has, at its inner end, a pinion 28ª meshing into the gear wheel 22, as shown in Figs. 1 and 2.

It will be seen then that when the crank shaft 23 is turned it revolves the gear wheel 22 which turns the gear wheel 21, the mandrel 18, and the saw 19, and at the same time the gear wheel 22, engaging the pinion 28ª, turns the feed screw 28 and this, acting on the nut 29, forces the carriage 17 forward so as to feed it as fast as the saw cuts.

When the machine is to be used it is fastened to a tree trunk, as shown in Figs. 1 and 2, the clamping plate 11 being fastened to the tree near the center and the side bar 15 being fastened to the side of the tree trunk, and the saw is then set in motion by turning the crank shaft, as just described. When the saw has cut through the trunk on one side, as shown in Fig. 2, the hook or spike 16 is unfastened and the side bar 15 swung around to the opposite side of the tree, as shown by dotted lines in Fig. 2, the crank shaft and feed screw are shifted to the opposite side of the carriage and the work proceeded with as before, and when the kerf is cut the tree will be so nearly sawed off that it will fall.

For use on small trees the cross bar 14 and side bar 15 may be dispensed with, the main bar 10 fastened to the tree, as above described and shown in Fig. 6, and the carriage 17 and nut 29 may be mounted on the main bar 10, so that the saw 19 may be driven straight into the tree as the said figure clearly shows.

Having thus described my invention, I claim as new and desire to secure by Letters Patent—

1. A sawing machine, comprising main and side bars pivoted together at one end and each provided with a device at the other to secure it to a tree, a carriage slidable on the side bar, a saw journaled on the carriage, a crank shaft on the carriage, geared to the saw, a nut pivoted on the side bar behind the carriage, and a feed screw fitted to the nut, journaled in the carriage and geared to the crank shaft, substantially as described.

2. The combination, with the sliding carriage and the nut behind the carriage, of the saw journaled on the carriage, the crank shaft geared to the saw, means for shifting the crank shaft from one side of the carriage to the other, a feed screw threaded in the nut and geared to the crank shaft, and means for shifting the feed screw from side to side of the carriage, substantially as described.

3. In a sawing machine, the combination of a frame, a carriage movable thereon, a saw and its mandrel mounted on the carriage, an operating shaft having a gear wheel, a feed screw connected at one end to the carriage and at the other end to the frame, and gear wheels on the feed screw and saw mandrel meshing with the gear wheel on the operating shaft, whereby the saw and its feed mechanism are simultaneously operated from the operating shaft, substantially as set forth.

4. In a sawing machine, the combination of a saw, a carriage whereon the saw is mounted, operating mechanism for the saw adapted to be shifted from side to side of the carriage, a frame having a guide way for the carriage, a nut pivotally mounted on the frame, a feed screw engaging said nut, bearings at opposite sides of the carriage to receive said feed screw, and gearing between the feed screw and saw-operating mechanism, whereby the former is driven from the latter, substantially as set forth.

FRANK COSTA.

Witnesses:
RICHD. LEWIS,
J. D. LUTZ.